United States Patent
Podgorski et al.

(10) Patent No.: US 10,830,701 B2
(45) Date of Patent: Nov. 10, 2020

(54) SCANNED LINE ANGULAR PROJECTION MICROSCOPY

(71) Applicant: Howard Hughes Medical Institute, Ashburn, VA (US)

(72) Inventors: Kaspar Podgorski, Ashburn, VA (US); Daniel Flickinger, Frederick, MD (US); Abbas Kazemipour, College Park, MD (US)

(73) Assignee: Howard Hughes Medical Institute, Ashburn, VA (US)

( * ) Notice: Subject to any disclaimer, the term of this patent is extended or adjusted under 35 U.S.C. 154(b) by 51 days.

(21) Appl. No.: 15/973,290

(22) Filed: May 7, 2018

(65) Prior Publication Data

US 2018/0321154 A1 Nov. 8, 2018

Related U.S. Application Data

(60) Provisional application No. 62/502,643, filed on May 6, 2017.

(51) Int. Cl.
  *G01N 21/64* (2006.01)
  *G02B 21/00* (2006.01)
  *G02F 1/35* (2006.01)

(52) U.S. Cl.
  CPC ....... *G01N 21/6458* (2013.01); *G02B 21/008* (2013.01); *G02B 21/0032* (2013.01);
  (Continued)

(58) Field of Classification Search
  CPC ......... G01N 21/6458; G01N 2201/067; G01N 2021/6478; G02F 1/3526; G02B 21/0076;
  (Continued)

(56) References Cited

U.S. PATENT DOCUMENTS

| | | | | |
|---|---|---|---|---|
| 6,028,306 A | * | 2/2000 | Hayashi | G02B 21/0032 250/235 |
| 2013/0126755 A1 | * | 5/2013 | Kemnitz | G01N 21/6408 250/459.1 |

(Continued)

FOREIGN PATENT DOCUMENTS

| | | |
|---|---|---|
| DE | 10118463 A1 | 10/2002 |
| DE | 102006009831 A1 | 9/2007 |
| DE | 102015107367 A1 | 11/2016 |

OTHER PUBLICATIONS

International Search Report and Written Opinion for Application No. PCT/US2018/031431, dated Jul. 9, 2018, 15 pages.

*Primary Examiner* — Michael C Bryant
(74) *Attorney, Agent, or Firm* — Brake Hughes Bellermann LLP

(57) ABSTRACT

Techniques are described for imaging a sample where the techniques include acquiring a raster scan image of the sample, providing light from a light source, directing the light into a plurality of different light beam paths at different times, providing light in each of the plurality of light beam paths through an objective lens to the sample, and providing light in each of the plurality of beams to different locations within the sample. Fluorescence emission light from the sample is detected in response to excitation by light in each of the plurality of light beam paths, where the detected fluorescence emission light corresponds to fluorescence intensity projections of the sample with low mutual coherence, and an image of the sample is generated based on the detected fluorescence emission light and based on the raster scan image.

36 Claims, 8 Drawing Sheets

(52) U.S. Cl.
CPC ....... *G02B 21/0076* (2013.01); *G02F 1/3526* (2013.01); *G01N 2021/6478* (2013.01); *G01N 2201/067* (2013.01); *G02B 2207/114* (2013.01)

(58) Field of Classification Search
CPC .............. G02B 21/008; G02B 21/0032; G02B 2207/114
See application file for complete search history.

(56) References Cited

U.S. PATENT DOCUMENTS

| | | | |
|---|---|---|---|
| 2015/0145981 A1* | 5/2015 | Anhut | G02B 21/0064 348/80 |
| 2015/0157210 A1* | 6/2015 | Zhang | G02B 21/0032 600/473 |
| 2017/0242232 A1* | 8/2017 | Leger | G02B 21/0036 |
| 2018/0177401 A1* | 6/2018 | Yang | H04N 7/18 |
| 2019/0113731 A1* | 4/2019 | Betzig | G01N 21/6428 |

* cited by examiner

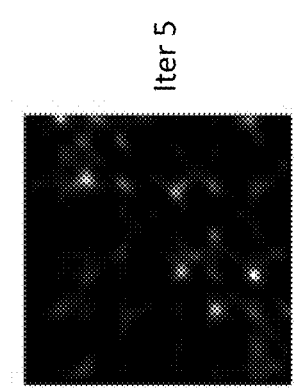
FIG. 7A Iter 1
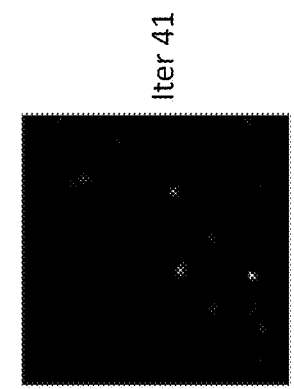
FIG. 7B Iter 3
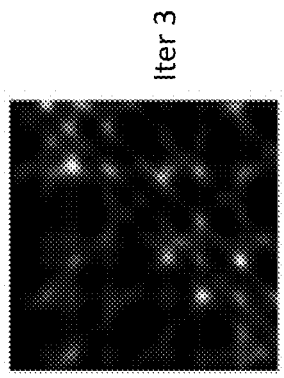
FIG. 7C Iter 5
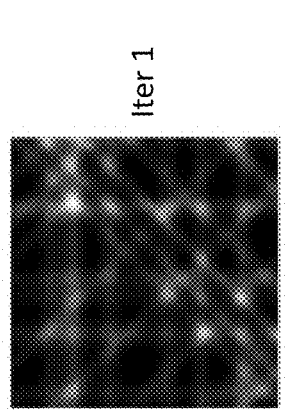
FIG. 7D Iter 11
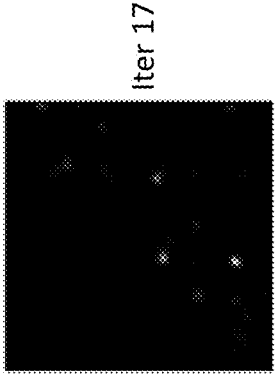
FIG. 7E Iter 17
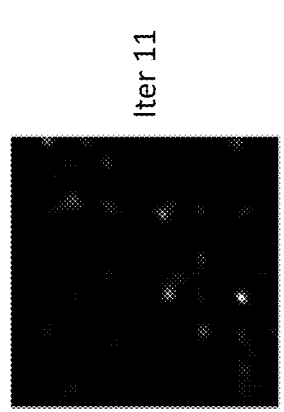
FIG. 7F Iter 41

SCANNED LINE ANGULAR PROJECTION MICROSCOPY

CROSS-REFERENCE TO RELATED APPLICATIONS

This application is a non-provisional of, and claims priority under 35 U.S.C. § 119 to, U.S. Provisional Patent Application No. 62/502,643, filed May 6, 2017, entitled "SCANNED LINE ANGULAR PROJECTION MICROSCOPY," the disclosure of which is incorporated herein in its entirety.

BACKGROUND

The study of biological samples, including the study of brain function, relies on measurement tools that achieve high spatial resolution over large volumes at high rates. Biological samples are often opaque, meaning that optical tools for studying intact tissues at high resolution must be insensitive to light absorption and scattering.

Two-photon imaging can achieve this insensitivity by using nonlinear absorption to confine fluorescence excitation to the high-intensity focus of a laser and prevent excitation by scattered light. All emitted fluorescence can be assigned to that focus regardless of scattering, without forming an optical image. Instead, an image is produced by scanning the focus in space. However, this serial approach to image acquisition creates a tradeoff between achievable framerates and pixel counts per frame. Common fluorophores have fluorescence lifetimes of approximately 3 ns, and brighter fluorophores tend to have longer lifetimes due to the association between fluorescence quantum yield and fluorescence lifetime. The fluorescence lifetime determines the probability of crosstalk between successive measurements acquired at a given rate, limiting the bandwidth of measurements. For imaging applications with a fluorescence lifetime of 3 ns, approximately 10 ns must pass between consecutive measurements to achieve acceptably low rates of crosstalk. The maximum achievable framerate for a 1-megapixel field of view (FOV) under raster-scanning fluorescence imaging is therefore approximately 100 Hz. In practice, pixel rates have been further limited by factors such as photodamage, fluorophore saturation, and scanner technology.

The consequences of the aforementioned pixel rate limit for raster imaging can be mitigated by more efficient sampling techniques. In many activity imaging paradigms, a dense pixel-based representation of the sample is recorded and then reduced to a lower-dimensional space, e.g., by selecting particular regions of interest from the recorded representation. By sampling this low-dimensional representation more directly, the equivalent result can be obtained with many fewer measurements. Several methods have previously been developed that can record from sample volumes using fewer measurements than raster scanning.

For example, random access imaging using acousto-optic deflectors enables sampling of a subset of points in the sampling region, with a fixed access time required to move the excitation focus between points. If the desired points are sparse enough in space, the time saved by not sampling the intervening area significantly outweighs the access time costs. Multifocal multiphoton methods scan a fixed pattern of focal points through the sample, allowing multiple sub-volumes to be acquired simultaneously. Extended depth of field methods, including Bessel beam excitation microscopy, can collapse the axial dimension of the sample, allowing projections of volumes to be acquired at the rate of two-dimensional images.

Multifocal and extended depth of field methods combine information from multiple pixels into each measurement, often necessitating computational unmixing for subsequent signal recovery.

Recovery of signals from mixed measurements is common in imaging and can involve methods that combine images with distinct optical transfer functions to improve resolution. In all imaging methods, the finite resolution of the imaging optics can cause pixels to contain signals from multiple sources, such as a neuron and its surrounding neuropil. Because of this, source recovery is often posed as an optimization problem, using implicit or explicit regularization to impose a desired statistical structure on the recovered signals, such as independence or sparsity. Compressive Sensing is a framework for the acquisition and unmixing of signals that admit a sparse representation in some basis (e.g., if they can be represented as a matrix product S*X where columns of X might be large but have few nonzero elements). By acquiring mixed signals and regularizing for sparsity during recovery, structured systems with many fewer measurements than unknowns can be accurately recovered if the measurements are conducted appropriately. Highly coherent measurements (i.e., ones that tend to mix a given source with others in the same way) make recovery of the underlying sources ambiguous, while incoherent measurements can guarantee accurate recovery. Existing implementations of multifocal multiphoton and extended depth of field methods use highly coherent measurements and/or cannot achieve kilohertz framerates for megapixel fields of view.

SUMMARY

In a general aspect, a method of imaging a sample includes acquiring a raster scan image of the sample, providing light from a light source, directing the light into a plurality of different light beam paths at different times, providing light in each of the plurality of light beam paths through an objective lens to the sample, and providing light in each of the plurality of beams to different locations within the sample. Fluorescence emission light from the sample is detected in response to excitation by light in each of the plurality of light beam paths, where the detected fluorescence emission light corresponds to fluorescence intensity projections of the sample with low mutual coherence, and an image of the sample is generated based on the detected fluorescence emission light and based on the raster scan image.

Implementations can include one or more of the following features, alone or in any combination with each other.

For example, light in different ones of the plurality of light beam paths can be provided to the sample to form a two-dimensional or three-dimensional intensity pattern in the sample with low mutual coherence between light intensities produced in the sample by different ones of the plurality of light beam paths. Light in different light beam paths can be provided to the sample at different angles with respect to a reference direction in a focal plane of the objective lens. Light in each of the plurality of light beam paths can be provided to the sample to form a line focus at a different angle with respect to a reference orientation. A width of the line of light can be specified by a resolution limit of an objective lens through which the line of light is provided to the sample.

The method can include switching the light from the light source with an electro-optical modulator into two different intermediate paths and switching the light in each of in the intermediate paths with a respective mechanical scanner into different ones of the plurality of light beams. Providing light in each of the plurality of beams to the sample can include modulating light in each of the plurality of light beams with a spatial light modulator to provide a programmable subset of the beam onto the light beam path that enters the sample. The programmable subset of the beam that enters the sample can correspond to one or more locations of sparse regions of interest in the sample.

Generating an image of the sample can include generating a plurality of three-dimensional images of the sample corresponding to different timepoints and labeling space-time coordinates of one or more particles in the sample that emit fluorescence light for the different time points. Generating an image of the sample can include generating a plurality of images of the sample corresponding to different timepoints, and whether each of a plurality of emitters in the images of the sample are active or non-active at the different time points can be determined. Locations of the plurality of emitters can be identified in an image corresponding to an initial timepoint, and whether each of the plurality of emitters at its identified location is active or non-active in images corresponding to timepoints after the initial timepoint can be determined.

The generated image can be a two-dimensional image. The generated image can be a three-dimensional image. The detected fluorescence emission light from the sample can be emitted in response to a two-photon excitation process. Providing light in each of the plurality of beams to different locations within the sample can include providing the light in the form of a line focus and scanning the light in the line focus across a focal plane of the sample. Generating an image of the sample based on the detected fluorescence emission light and based on the raster scan image can include generating the image using an optimization algorithm to determine a the brightness of segments of the sample. The raster scan image can be acquired based on light provided to the sample in at least one of the plurality of different light beam paths.

In another general aspect, a microscope for imaging a sample includes a first light source configured for generating first excitation light, raster scanning optical elements configured for raster scanning the first excitation light through the sample, and a first detector configured for detecting light emitted from the sample in response to the raster scanned first excitation light. The microscope also includes a second light source configured for generating second excitation light, and beam handling optics configured for: directing the second excitation light into a plurality of different light beam paths at different times, providing the light in each of the plurality of light beam paths through an objective lens to the sample, and providing light in each of the plurality of beams to different locations within the sample. The second light source can be identical to the first light source or can be different. The microscope also includes a second detector configured for detecting fluorescence emission light from the sample in response to excitation by the second excitation light in each of the plurality of light beam paths, where the fluorescence emission light detected in response to the second excitation light in different ones of the plurality of light beam paths corresponds to fluorescence intensity projections of the sample with low mutual coherence. The first and second detectors can be different or can be an identical detector. The microscope also includes a processor configured for generating an image of the sample based on the detected light emitted from the sample in response to the raster scanned first excitation light and based on the detected fluorescence emission light emitted from the sample in response to excitation by the second excitation light in each of the plurality of light beam paths.

Implementations can include one or more of the following features, alone or in any combination with each other.

For example, light in different ones of the plurality of light beam paths can be provided to the sample to form a two-dimensional or three-dimensional intensity pattern in the sample with low mutual coherence in the sample between light in different ones of the plurality of light beam paths. Light in different light beam paths can provided to the sample at different angles with respect to a reference direction in a focal plane of the objective lens.

Light in each of the plurality of light beam paths can be provided to the sample to form a line focus at a different angle with respect to a reference orientation. A width of the line of light can be specified by a resolution limit of the objective lens through which the line of light is provided to the sample.

The beam handling optics can include an electro-optical modulator configured for switching the light from the second light source into two different intermediate paths, a first mechanical scanner configured for switching light in an intermediate path into different ones of the plurality of light beams, and a second mechanical scanner configured for switching light in the other intermediate path into different ones of the plurality of light beams.

The microscope can also include a spatial light modulator configured to provide a programmable subset of the beam onto the light beam path that enters the sample. The programmable subset of the beam that enters the sample can correspond to one or more locations of sparse regions of interest in the sample. Generating an image of the sample can include generating a plurality of three-dimensional images of the sample corresponding to different timepoints and labeling space-time coordinates of one or more particles in the sample that emit fluorescence light for the different time points.

Generating an image of the sample can include generating a plurality of images of the sample corresponding to different timepoints, and determining whether each of a plurality of emitters in the images of the sample are active or non-active at the different time points.

The processor can be further configured for identifying locations of the plurality of emitters in an image corresponding to an initial timepoint, and determining a brightness of a plurality of emitters in images corresponding to timepoints after the initial timepoint.

The generated image can be a two-dimensional image. The generated image can be a three-dimensional image. The detected fluorescence emission light from the sample can be emitted in response to a two-photon excitation process.

Providing light in each of the plurality of beams to different locations within the sample can include providing the light in the form of a line focus, and scanning the light in the line focus across a focal plane of the sample.

Generating an image of the sample based on the detected fluorescence emission light and based on the raster scan image can include generating the image using an optimization algorithm to determine a brightness of segments in the sample. The raster scan image can be acquired based on light provided to the sample in at least one of the plurality of different light beam paths.

BRIEF DESCRIPTION OF THE DRAWINGS

FIGS. 7A, 7B, 7C, 7D, 7E, and 7F are schematic diagrams of the locations of four non-parallel excitation beam lines that correspond to a peak in the emission counts from the line as the line is scanned through the sample.

Like reference numerals in the different figures describe like elements in the different figures.

DETAILED DESCRIPTION

Figure 1:
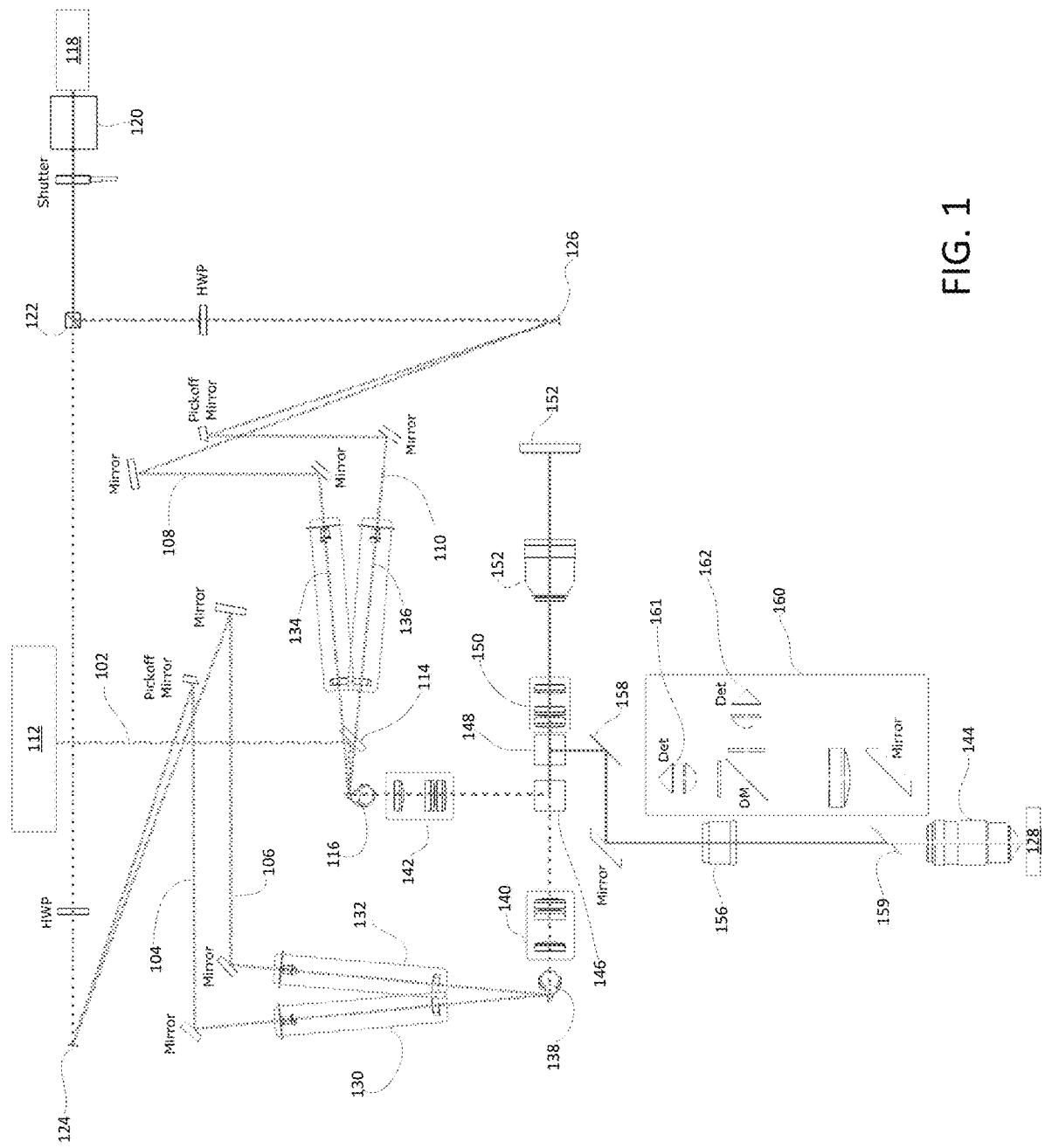
FIG. 1 is a schematic diagram of a microscope system 100.

With point scanning imaging techniques, the maximum serial pixel rate in two-photon imaging is limited, for example, to $10^8$ Hz. To image a frame of 1000×1000 pixels, a serial pixel rate of $10^8$ Hz implies a frame acquisition rate of 100 Hz or less. To overcome this limitation, techniques are described herein for acquiring two-photon images of a sample with frame acquisition rates exceeding 1000 Hz for fields of view greater than 1 million pixels in each frame. In the described techniques, a plurality of incoherent projections of the sample is obtained (e.g., by scanning lines of excitation light across the sample at multiple angles) and a high resolution image is obtained from a combination of the multiple incoherent projections and prior structural information about the sample, which can include a separately acquired raster image. With these techniques dynamic activity can be recovered with diffraction-limited spatial resolution across the entire field of view using several thousand measurements per frame. Masking the excitation pattern with an amplitude-modulating spatial light modulator enables random access imaging of programmable spatial patterns within a focal plane. Unlike random access imaging with acousto-optic or electro-optic deflectors, this method requires no tradeoff between framerate and pixel counts.

In particular, techniques are described herein for recovering dynamic or temporal information from an imaged sample (e.g., temporal neural activity or movement/diffusion of particles within the sample) from highly incoherent mixed measurements using statistical priors (e.g. a detailed structural image of the sample and a model of indicator dynamics for recovering neural activity). These priors can be applied with or without regularization for sparsity. The techniques can be used to localize particles below the resolution limit of light microscopy, and track moving particles over time. The microscope implementing these techniques retains the high spatial resolution and insensitivity to scattering of conventional two-photon imaging, uses known spatiotemporal structure of samples to increase framerate, is insensitive to sample motion, enables highly accurate source recovery by performing efficient incoherent measurements, and adapts to a variety of experiments.

The microscope can scan different excitation light beams across the focal plane of the microscope at a plurality of different orientations to obtain linear projections of the sample. In an implementation, a plurality (e.g., four) of excitation line foci can be used to obtain the projections. Line foci are relatively simple to produce optically, efficiently sample a compact area by scanning, can achieve diffraction-limited spatial resolution, produce two-photon excitation more efficiently than non-contiguous foci of the same area, and form a low-coherence basis for the purpose of computational unmixing. While line foci of excitation light are described herein other geometries resulting in fluorescence intensity projections of the sample with low mutual coherence are also possible. For example, irregular lattices of diffraction limited spots could be used, with different lattices resulting in fluorescence intensity projections of the sample with low mutual coherence.

This approach can be known as Scanned Line Angular Projection Microscopy (SLAPMi). SLAPMi can sample the entire field of view (FOV) with four line scans, and the frame time is proportional to resolution, versus resolution squared for a raster scanning, resulting in greatly increased frame rates for large fields of view. In an implementation, SLAPMi images a 250 μm×250 μm field of view with 200 nm resolution elements at a framerate of 1016 Hz, corresponding to over 1.4 billion pixels per second, recovered from 5 million sequential multiplex measurements per frame.

Particle Tracking

For samples that are sufficiently sparse in space, the raster image of the sample can be recovered from SLAPMi measurements without additional structural information. This mode of operation was demonstrated by localizing and tracking fluorescent particles. As each line focus is scanned across the field of view, fluorescent particles each produce signals corresponding to their position on each one-dimensional scan axis. From these measurements and the projection matrix of the microscope (e.g., obtained separately by scanning fluorescent beads of fixed position), the maximum likelihood raster image for any given frame can be reconstructed using Richardson-Lucy (RL) deconvolution. Scanning mirror positions can be recorded synchronous to each measurement, and can be used to determine the positions of the beams that correspond to detected intensity from different pixels of the sample.

As the number of particles in a given field of view increases, the maximum likelihood reconstructions may begin to show spurious peaks. Regularization can be used to remove spurious peaks. Spurious localizations can be rejected by tracking algorithms that use priors on the motion dynamics of genuine particles. Such methods are robust to spurious localizations when the expected displacement per frame is small and genuine tracks span many frames.

Imaging Activity

To record neuronal activity with SLAPMi, the data matrix consisting of measurements over time can be decomposed into the product of spatial and temporal components. As a prior for recovering activity patterns, the number of spatial components can be reduced by segmenting a raster-scanned fluorescence image of the sample obtained separately. In an implementation, raster images are segmented by training hierarchical random forest pixel classifiers to identify voxels outside of labelled cells versus those belonging to labelled cellular compartments, then classified pixels are grouped into spatially contiguous seeds by skeletonization and watershedding.

In an implementation, frames are estimated by assigning an intensity to each segment, and a static background intensity per-pixel, according to the following model:

$$y_t \sim Poisson(PSF_t + b_t)$$
$$F_t = \theta F_{t-1} + w_t.$$
$$P_t \geq 0, S_t \geq 0, \theta \geq 0, w_t \geq 0$$
$$\theta = \exp\left(-\frac{T_s}{2\tau_{min}}\right), b_t \geq 0$$

which is solved for the term w by a multiplicative update algorithm.

In some cases, a voxel-space representation of activity components is not necessary, for example when extracting principal components of population activity in brain imaging experiments. In such cases, the SLAPMi measurement matrix can be directly factorized without segmentation, to obtain temporal activity components and their corresponding spatial pattern in the projected measurement space, using non-negative matrix factorization algorithms.

SLM Masking

Economy of illumination power can be an important design principle in biological imaging. Acceptable power levels in conventional two-photon imaging can be limited by brain heating, and heating is even more limiting for two-photon projection microscopy, because extended foci require a concomitant increase in power to maintain non-linear excitation efficiency.

To reduce power usage, reduce background excitation, lower the degree of parallelization, and enable imaging of selected features within densely labeled samples, a spatial light modulator (SLM) can be located at a conjugate position to the sample plane in the excitation path, in in an amplitude modulating geometry. This configuration can be used to select an arbitrary pattern in the focal plane for imaging and to discard the remaining excitation light, making SLAPMi a random access microscope. This reduces excitation power in sparse samples and allows users to artificially introduce sparsity into densely labeled samples. When imaging sufficiently sparse samples, the SLM allows SLAPMi to use average powers lower than a conventional raster scanning two photon-microscope for a given field of view.

FIG. 1 is a schematic diagram of a microscope system 100 that can be used for implementing the techniques described herein. The microscope system 100 can include five excitation paths, with one raster scanning beam 102 and four line scanning beams 104, 106, 108, 110.

The raster scanning beam 102 originates from an ultrafast mode-locked light source (e.g., a laser) 112 and can be introduced into the main optical path by a flip mirror 114. The beam can be scanned by a 2D galvo pair 116 as in a conventional two-photon microscope. In some implementations, the raster beam 102 can be combined into the optical path by a dichroic mirror, allowing excitation through this path simultaneous with the line scan excitation.

The line scan beams 104, 106, 108, 110 can originate from a single laser source 118 (e.g., a 1030 nm, 190 fs, tunable Yb:YAG laser with a repetition rate of 1-10 MHz and delivering pulse power of 9 W). An electro-optic modulator (EOM) 120 can be used to rapidly switch the beam between two paths by rotating its polarization prior to a polarizing beam splitter (PBS1) 122. On each path, a galvanometer mirror 124, 126 can switch the beams between two paths. This configuration allows the initial beam from the laser 118 to be sequentially directed onto the four paths 104, 106, 108, 110 with a switching time limited by the EOM 120 (~1 μs per switch in an implementation). Only one of the line scan paths is illuminated and provides excitation light to the sample 128 at any given time. In some implementations, the microscope system 100 could use one of the line scan beams 104, 106, 108, 110 as the raster beam 102 to acquire the raster scan data.

Each path 104, 106, 108, 110 can include a line generator unit 130, 132, 134, 136 for generating a light from the beam input to the line generator unit. The line generator units can include an aperture followed by a series of cylindrical lenses, which can redistribute a Gaussian input beam into a uniform line of tunable aspect ratio. The two pairs of paths 104, 106, 108, 110 each can be combined at the aperture of a 2-dimensional scanning galvonometer mirror pair 116, 138. The resulting two paths (one exiting each X-Y galvo pair) can each pass through a scan lens 140, 142 to form an intermediate image.

The line generator units 130, 132, 134, 136 can be used to impart a 1D angular range on an incoming, collimated laser beam having a 2D Gaussian (or similarly peaked) spatial intensity distribution, such that when that beam is focused by a objective 144 it makes a line focus in the sample 128 with substantially uniform intensity distribution along the line, and diffraction-limited width in the focused dimension. The line generator units 130, 132, 134, 136 can use three cylindrical lenses. The first cylindrical lens can impart a large, negative spherical aberration (in 1D) to the beam, which is used to transform the initial, peaked spatial intensity distribution, over a large percentage of the beam width, into a substantially uniform angular intensity distribution. The two subsequent cylindrical lenses can refocus the light in 1D onto the galvanometer mirrors that are at the entrance pupil of the microscope optical system. Thereafter, the microscope transforms the uniform 1D angular intensity distribution at the pupil into a uniform 1D spatial intensity distribution at the line focus in the sample 144. The relative lateral and axial translations of the first two cylindrical lenses allows an adjustment of the transform between the initial spatial intensity profile and subsequent angular intensity profile. Because using spherical aberration to linearize an initial peaked power distribution can produce tails of higher or lower intensity than the center, a 1D mask can be used at the beginning of the line generator units 130, 132, 134, 136 to remove the tails from the intensity distribution of the incoming beam. Furthermore, because a sharp-edged mask at this location would create a 1D symmetric diffraction pattern in the beam, which would result in deep peaks and valleys in the spatial intensity distribution of the final line focus, a mask with toothed edge profile can be utilized. The non-uniform profile in the orthogonal axis (where the cylindrical lenses have no power and the beam is focused at the sample) creates a 2D diffraction pattern which, when collapsed down to one dimension by the final focusing, contributes much less modulation to the line intensity distribution. Alternately, the first two cylindrical lenses could be replaced by a suitable acylinder lens. Such a system would have fewer degrees of freedom to actively adjust the final line intensity distribution, but could work without the 1D toothed mask, as the acylinder would allow an intensity transform function that can utilize the full tails of the initial spatial intensity distribution.

The beam paths 104, 106, 108, 110 can be combined again using a nonpolarizing beamsplitter (NPBS) 146, which results in a loss of 50% of the beam, but allows the two transmitted beams to share the same polarization, which is transmitted by a polarizing beam splitter (PBS2) 148. The transmitted beam can be relayed using a pair of scan lenses 150, 152 to form an intermediate image on the surface of a reflective liquid crystal spatial light modulator (SLM) 154, which modulates the polarization of the beam across the wavefront of the beam according to a programmable spatial pattern on the SLM. The reflected light from the SLM 154 passes through the same relay lenses 150, 152 and modulated light is reflected at PBS 148.

Alternatively, in some implementations, other types of wavefront modulating elements (e.g., a polarization-independent spatial light modulator or digital micromirror device could) be used for amplitude modulation of beamlets of the beam, allowing a polarizing beamsplitter to be used for beam combining in place of the NPBS 146. This would require an altered geometry surrounding the SLM 154 involving two separate relays. The spatially modulated beam can be relayed via a tube lens 156 and objective 144 to form the excitation image within the sample 128.

The excitation light provided to the sample excites emitters in the sample through a two photon process, and fluorescence emission light from the emitters is collected by the objective 144 and reflected by a dichroic mirror 158 toward a detection arm 160 configured similarly to other two-photon microscopes.

With the microscope system 100, a single beam input can be steered into multiple (e.g., four) distinct beam paths by the combination of the EOM 120 and the two single axis galvos 124, 126. The two single axis galvos 124, 126 can act both to de-multiplex two beams, and to scan each beam across the FOV of the sample. While the EOM 120 steers the beam to one path all galvos on the other path can execute flyback scans. With the EOM 120 switches the beam to a given path the galvo 124 or 126 holds the path in a fixed position and the galvos 116, 138 can execute a linear scan of the associated excitation beam across the FOV. This allows all four beams to be sequentially scanned across the FOV.

Thus, the microscope system 100 can provide a plurality of beams (e.g., four beams) to a sample, where the beams are provided to the sample at different angles with respect to a reference orientation within a plane of the sample, which is perpendicular to the optical axis of the objective lens 144. For example, in an implementation, the beams can be provided to the sample through the objective lens 144 in the form of line foci, where the axes of the line foci of the different beams are aligned along different axes within the focal plane of the objective. In addition, the different beams can be provided to a back pupil of the objective at different angles with respect to the optical axis of the objective lens 144. Thus, illumination of a particular voxel within the ample 128 by different beams occurs as a result of the different beams passing through the voxel at different angles with respect to the optical axis of the objective lens 144 (i.e., the z-axis of the system 100) and therefore passing through different portions of the sample 128 above and below the focal plane.

For a given focal area within the sample plane, coherent line foci can produce more efficient two-photon excitation than arrays of isolated points. This effect is partly because the edges of isolated points produce weak excitation, but line foci have a lower perimeter to area ratio than isolated points, making excitation more efficient.

The beams can excite emitters in the sample to emit fluorescence radiation (e.g., in response to two-photon excitation by the provided beam) and the fluorescence radiation can be detected by a detector. Each beam of the plurality of beams can be scanned through the sample, for example, in a direction perpendicular to the axis of the beam, and the fluorescence radiation emitted from the sample can be detected as a function of position of the beam in the sample. In the case of a line focus beam, the detection of fluorescence radiation emitted from the sample corresponds to detecting one or more emitters located along the line of the beam. The different beams can be provided to the sample, and scanned across the sample, at different times. Information from the detected signals resulting from the scanning of the different beams across the sample can be combined to generate an image of the sample. For example, detected intensity data, along with information about the angular orientations of the lines of excitation light that produced the intensity data, and a statistical prior on the image, can be combined to generate the image of the sample.

Axial scanning of the excitation light with respect to the sample 128 (i.e., in a direction perpendicular to the focal plane of the objective 144) can be achieved by translating the objective 144 with a piezo objective stage or similar device, or by a remote focusing system placed after the SLM 154 in the optical path. Axial scanning can be used to generate a plurality of images of the sample 128, with the different images corresponding to different planes of the sample perpendicular to the focal plane of the objective 144, and then the different images can be combined to generate a three-dimensional image of the sample.

Wide-field epifluorescence illumination and camera detection (not shown) can be coupled into the objective 144 via a shortpass dichroic mirror 158 that transmits visible light.

A comparison of FIG. 2 and FIGS. 3-7 illustrates how images can be generated faster from line scanning than from raster scanning of a point of excitation light.

Figure 2:
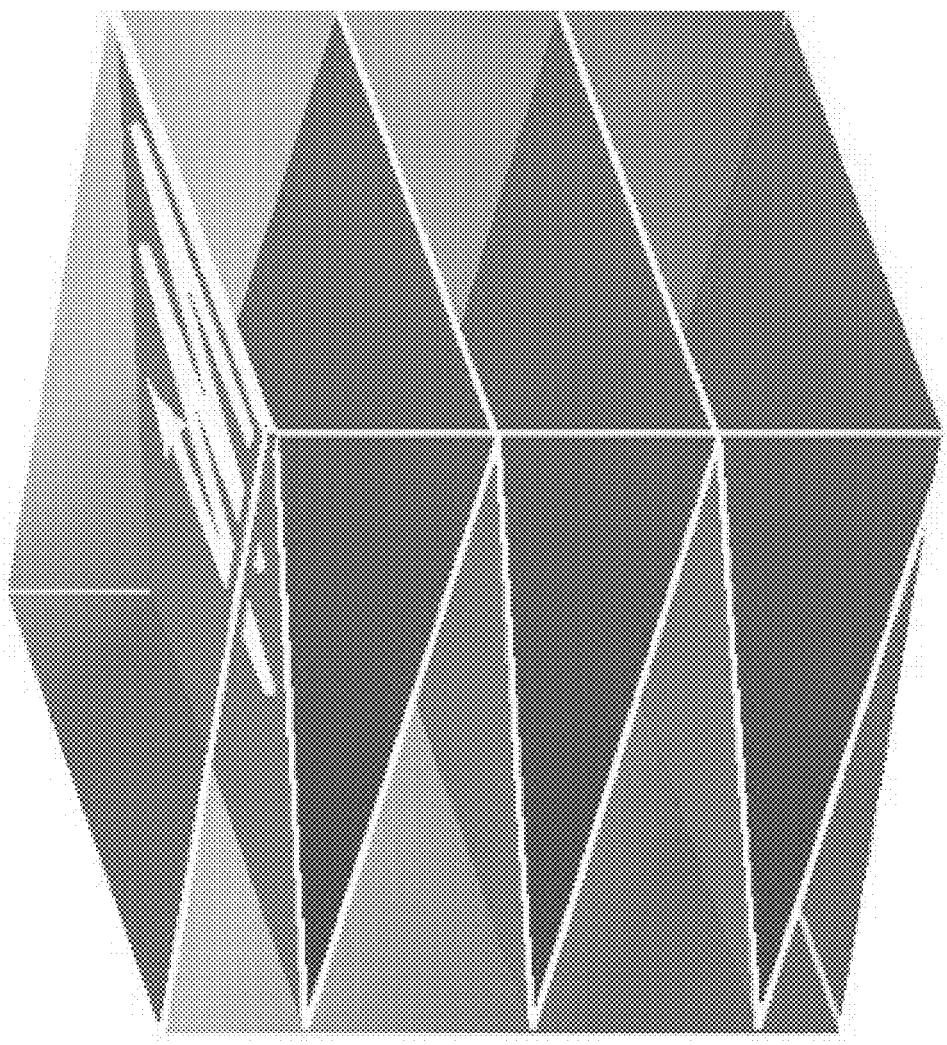
FIG. 2 is a schematic diagram of a three-dimensional volume in which a point of excitation light is raster scanned to generate fluorescence light that is detected and then used to generate an image.

FIG. 2 is a schematic diagram of a three-dimensional volume 200 in which a point of excitation light is raster scanned to generate fluorescence light that is detected and then used to generate an image. To generate a three-dimensional image with 100,000,000 pixels, the point would need to be raster scanned to 100,000,000 locations corresponding to the pixels.

Figure 3:
FIG. 3 is a schematic diagram of a two-dimensional image created from raster scanning of a point of excitation light through a sample with a plurality of emitters.

FIG. 3 is a schematic diagram of a two-dimensional image created from raster scanning of a point of excitation light through a sample with a plurality of fluorescent beads. The beads appear in FIG. 3 as points of light.

Figure 4:
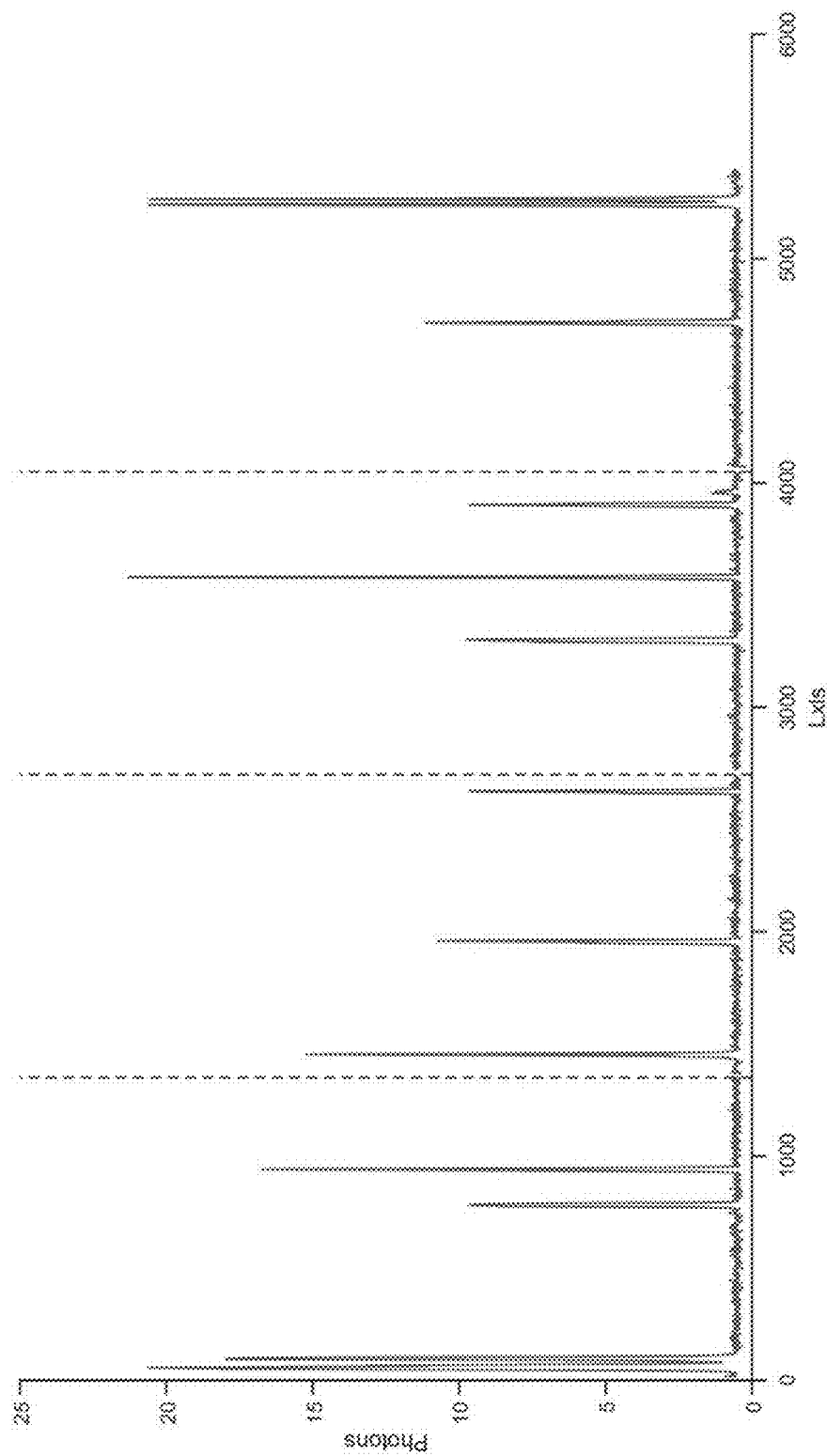
FIG. 4 is a schematic plot of photon counts measured by the detector as a function of line focus position as a line of excitation light is scanned across the sample in a number of steps.

FIG. 4 is a schematic plot of photon counts measured by the detector as a function of line focus position as a line of excitation light is scanned across the sample in approximately 5300 steps. Peaks in the plot correspond to strong fluorescence emission from one or more points along the line. When multiple lines are scanned across the sample in different directions, then peaks observed in the spectra for different lines can be cross-correlated to determine the two- or three-dimensional locations of individual emitters.

Figure 5:
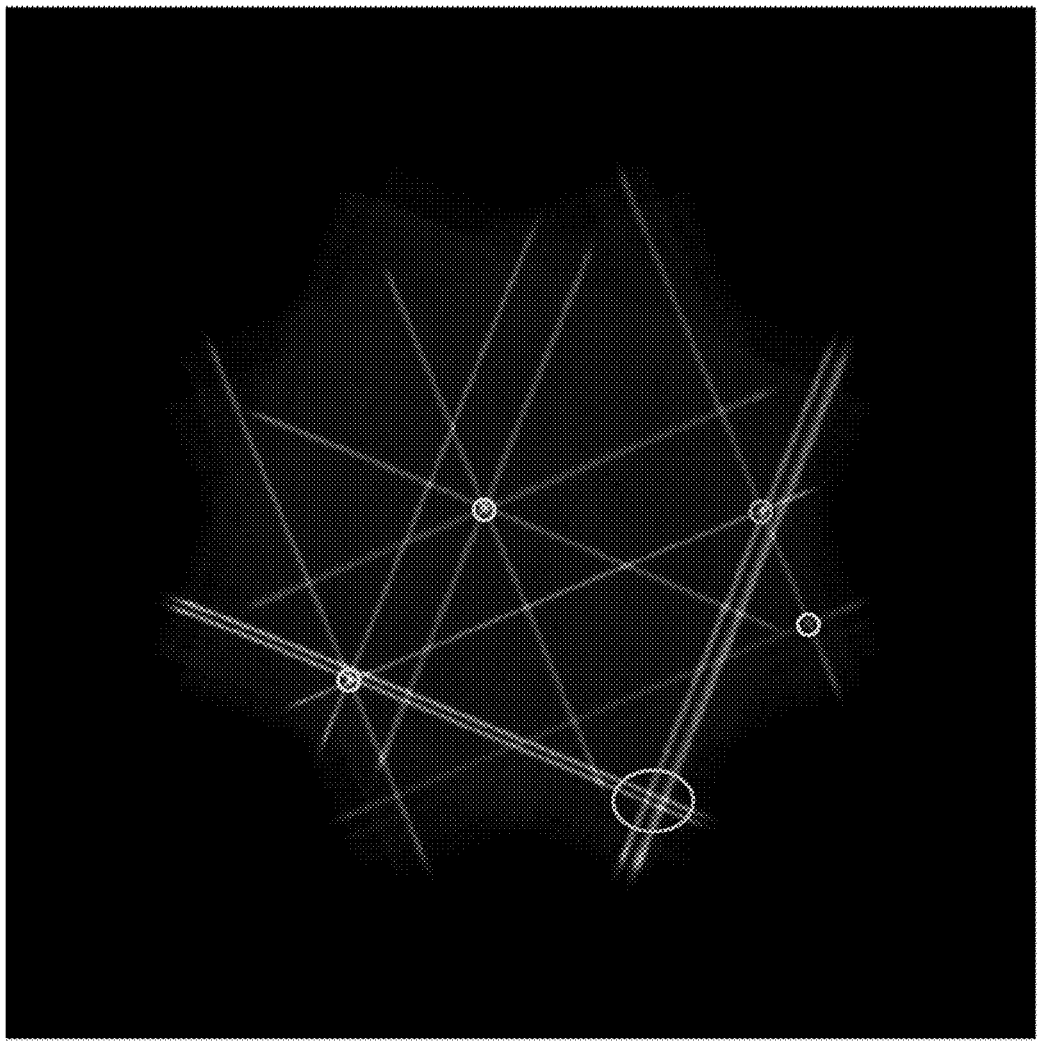
FIG. 5 is a schematic diagram of the locations of four non-parallel excitation beam lines that correspond to a peak in the emission counts from the line as the line is scanned through the sample.

FIG. 5 is a schematic diagram of the locations of four non-parallel excitation beam lines that correspond to a peak in the emission counts from the line as the line is scanned through the sample, as in the example of FIG. 4. Locations at which four lines intersect can correspond to locations of individual emitters in the sample. This method of determining particle locations can be performed with any number of non-parallel line projections greater than two. With two line angles, the location of a single particle can be determined. Using other incoherent extended focal patterns, analogous methods using backprojection or Richardson-Lucy deconvolution can be used to identify particle locations and intensity values to assign to the particle locations.

Figures 6A, 6B, 6C:
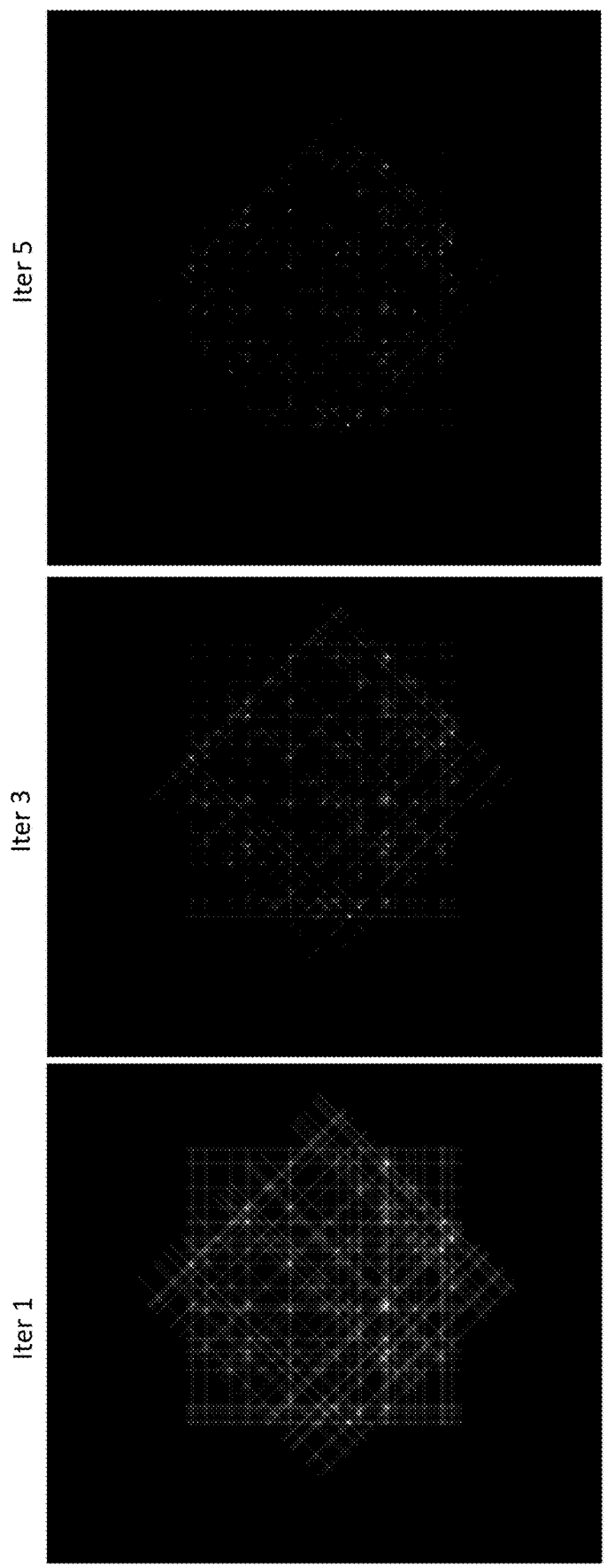
FIGS. 6A, 6B, and 6C are schematic diagrams of the locations of four non-parallel excitation beam lines that correspond to a peak in the emission counts from the line as the line is scanned through the sample.

FIGS. 6A, 6B, and 6C are schematic diagrams of the locations of four non-parallel excitation beam lines that correspond to a peak in the emission counts from the line as the line is scanned through the sample—similar to that of FIG. 5. The density of emitters in FIGS. 6A, 6B, and 6C is higher than the density of emitters in FIG. 5, which complicates the process of determining locations of individual emitters from the fluorescence emission signals from the individual scanned lines. Thus, an iterative process (e.g., Richardson-Lucy deconvolution), can be used to localize individual emitters, with FIGS. 6A, 6B, and 6C illustrating the results of first, third, and fifth iterations of the process.

FIGS. 7A, 7B, 7C, 7D, 7E, and 7F are schematic diagrams of the locations of four non-parallel excitation beam lines that correspond to a peak in the emission counts from the line as the line is scanned through the sample, with the successive Figures showing an iterative process, similar to that shown in FIGS. 6A, 6B, and 6C, but with 41 iterations, rather than just five, that can be used to localize individual emitters.

Thus, in the simplest scanning scheme, each image frame can be generated from a single scan of each line orientation across the field of view (FOV) of the sample 128, and the maximum frame rate can be determined by the cycle rate of the galvanometers (e.g., ~1300 Hz for a 250 µm×250 µm FOV, limited, in an implementation, by heat dissipation in the galvo servo controllers. In some implementations, the frame rate can be synchronized with the refresh rate of the SLM 154 to avoid mild artifacts. In more complex scanning schemes, tiled scanning patterns of the line foci can be used to efficiently scan larger fields of view at slightly reduced framerates (e.g. a 500 µm×500 µm FOV at 800 Hz for tiling factor 2, in an implementation). In principle, these frame rates can be increased without substantial changes in the design by increasing scanner cycle rates and laser repetition rate. The maximum framerate of the microscope diagrammed herein would be achieved at a laser repetition rate of ~100 MHz, above which the fluorescence lifetime could substantially mix consecutive measurements.

The number of paths used to generate an image can be selected to best suit tradeoffs between the cost of optomechanical complexity and acquisition speed (favoring fewer paths) and benefits to source recovery (favoring more paths).

The parallel excitation used in SLAPMi results in large numbers of emission photons (e.g., 0-400) arriving simultaneously in response to a single laser pulse, which necessitates using detectors 160,162 having a large dynamic range, and favors a detector with low multiplicative noise. In some implementations, Silicon Photomultiplier (SiPM) detectors can be used to meet this requirement.

The Spatial Light Modulator 154 of the microscope system 100 can be used as an amplitude modulator to reject unnecessary excitation light. For example, cortical dendrites fill only a small fraction of their enclosing volume (e.g., <3% of voxels), thus allowing the majority of excitation light to be discarded. A buffer of several microns surrounding all points of interest may be retained to guard against brain movement. The fraction of the SLM 154 that is active can depend on the amplitude of motion and the sample structure (e.g., it can be approximately 10% in most imaging experiments, substantially decreasing average excitation power).

A reference image of the sample (e.g., a high resolution raster scanned image) can be used in combination with the information derived from the signals detected when the lines are scanned to generate high-resolution images of the sample from the low-dimensional information recovered from the fluorescence emission due to line scanning. The reference image can be used to provide prior information about the sample (e.g. by producing a spatial segmentation), so that additional information picked up by the fast, low-dimensional line scanning can be combined with the prior information to allow fast high-resolution imaging of the sample.

Reiterating and elaborating on the techniques described above, to recover neural activity (e.g., temporal activity of neurons in the sample or particle movements within a sample) with the microscope system 100, a common sample representation can be used in which fixed spatial components vary in brightness over time. The spatial components can be obtained from a separate high-quality raster-scanned volume image, which can be acquired in a way that removes warping and motion artifacts. This reference volume can be segmented using a manually trained pixel classifier to identify compartments within labeled neurons, and a skeletonization-based algorithm that divides neurites into small segments, resulting in many (e.g., up to 1000) compartments per plane. Source recovery can include assigning an intensity f to each compartment at each frame according to the following model:

$$y_t \sim Poisson(PSF_t + b_t)$$

$$F_t = \theta F_{t-1} + w_t.$$

$$\theta = \exp\left(-\frac{T_s}{2\tau_{min}}\right)$$

$$P_t \geq 0, S_t \geq 0, \theta \geq 0, w_t \geq 0, b_t \geq 0,$$

where Y are the line scanned measurements (# measurements×# frames), PSF is the point spread function of the system, P is the projection matrix, S encodes the segmented reference image, b is a baseline fluorescence level, and $T_{min}$ is the fastest decay time constant of the indicator. The term that must be estimated is W, the innovations in the order-1 autoregressive process F. W can be estimated by minimizing the Poisson loss objective function:

$$\mathcal{L}(W) = \sum_{t=1}^{T} 1^T(PSF_t + b_t) - y_t^T \log(PSF_t + b_t),$$

$$\text{s.t. } w_t \geq 0$$

In some cases, an image generated from a raster scan may need to be corrected before it is used. For example, raster images of the sample can be warped by many factors, including nonlinearity in the scan pattern, sample motion, and a 'rolling shutter' artifact of the raster scan, and these errors can be corrected in the reference stacks to perform accurate source recovery. Compensation for warping can be achieved by collecting two sets of reference images interleaved, one with each of the two galvos acting as the fast axis. Motion of the sample can be assumed to be negligible during individual line scans along the fast axis (~300 μs), and it can be assumed that the galvo actuators track the computer control commands accurately along the slow axis, obviating the need for precise high-speed scanner position measurements. These assumptions allow recovery of unwarped 2D images by a series of local image registrations.

In some implementations, the reference stack can be segmented into compartments, such that the number of compartments in any imaging plane is less than the number of measurements. For example, for analyzing images of neurons, a manually trained pixel classifier can be used to label each voxel in the volume as belonging to a dendritic shaft, a spine head, a another fluorescent region, or dark. Rather than deconvolving the reference stack or attempting to label features finer than the optical resolution, features can be labeled at the optical band limit, and the projection matrix, P, used in the iterative deconvolution process can be designed such that it accounts for the transformation from the point spread function of the raster scan to that of each line scan. A skeletonization-based algorithm can be used to agglomerate labeled voxels into short segments that approximately correspond to individual spines or short segments of dendritic shafts. Segments that are predicted to produce very few photon counts (after considering SLM masking) can be merged to their neighbors to improve image recovery.

The projection matrix (P) can be measured in an automated calibration step using a thin (<<1 μm) fluorescent film. Images of the excitation focus in the film, collected by a camera, allow a correspondence to be made between the positions of galvanometer scanners and the location of the resulting line focus. The raster scanning focus is also mapped, to create a model of the line foci transformed into the space of the sample image obtained by the raster scan. The point spread function of any focus can be mapped at higher resolution by raster scanning over an isolated fluorescent particle to form an image.

Recorded data can be spatially registered to compensate for sample motion. As with raster imaging, small translations can be sufficient to impact activity recordings in fine structures. Frame-by-frame alignment can be first performed by cross-correlation of each projection axis on each frame to a consensus centroid of the measurements to correct for rapid in-plane motion of the sample. Registration can be performed by identifying the 3D translation of the sample that maximizes the sum of correlations between the recorded signal and the expected measurements. If the SLM is not used, this objective can be well approximated by using cross-correlations that can be rapidly computed. When the SLM is used, an iterative multiscale grid search can be performed using the full measurement matrix to obtain a more accurate alignment.

To deconvolve the information from the different line scanned fluorescent emission signals, a solver can be used to perform a constrained maximum a posteriori (MAP) estimation on the innovations ($w_t$'s) in the state-space model given by:

$y_t \sim \text{Poisson}(\text{PSF}_t + b_t)$ $F_t = \theta F_{t-1} + w_t$ for $t = 1, \ldots, T$ All terms are constrained to be nonnegative in the above model. The solver can perform a modified form of Richardson-Lucy deconvolution (RL) that incorporates the autoregressive (AR(1)) dynamics of the model ("dynamic RL"). RL iterations converge to the maximum likelihood solution to unmixing problems under Poisson sampling statistics. This can be done by iteratively multiplying an estimator by the ratio of two positive terms, the difference of which is the gradient of the error. The RL iterations can be adapted by computing the gradient of the objective function in the state-space dynamic model with respect to the innovations (w), splitting this into two positive terms, and forming multiplicative updates analogous to RL. Solving with respect to the nonnegative innovations can enforce the desired dynamics. This approach is equivalent to augmentation of the measurement matrix (PS) with AR dynamics and solving the RL iterations for the innovations. Utilizing the time-invariance of the PSF, this can be done efficiently via RL updates followed by filtering operations using the AR dynamics. The partial derivative of the objective function with respect to $w_t$ is:

$$\sum_{\tau=t}^{T} \theta^{\tau-t}((PS)^T 1 - (PS)^T(y_\tau \otimes PSx_\tau))$$

Therefore, the positive and negative terms of the update are:

$$L_p = \sum_{r=t}^{T} \theta^{r-t}(PS)^T 1$$

and $$L_n = \sum_{r=t}^{T} \theta^{r-t}(PS)^T(y_r \otimes PSx_r)$$

This constitutes the update rule for dynamic RL: $W^{k+1} = L_n/L_p * W^k$. Additionally the spikes can be constrained not to change by more than a factor of 10 on each iteration, by clipping the gradients to satisfy $0.1 < L_n/L_p < 10$. The solver can initialized with a positive constant F.

Updates following the direction of the gradient fail to fully account for the properties of the AR(1) model in a small number of iterations, namely the conditional independence of elements of $F_{t'>t}$ on elements of $w_t$ given intervening elements of F. Because of this property, no $w_t$ need be made larger than the value that maximizes the likelihood at the $t^{th}$ timepoint, because any further increase to $w_t$ could instead be applied to $w_{t'>t}$ to better effect. The update that considers the gradient at the $t^{th}$ timepoint alone is the unmodified RL iteration. Therefore a modified update rule can be used that is the minimum of the dynamic update and that of unmodified RL. This update rule alters the direction of update steps relative to dynamic RL but has the same stationary point.

The baseline b can be estimated from a minimum of smoothed measurements ($y_t$'s), yielding a rank-one estimate. In some implementations, a fraction of this baseline can be used or it can be updated using RL multiplicative updates as an outer loop to the described method.

Maximum likelihood solutions are known to amplify noise, and RL reconstructions are typically terminated after relatively few (<100) iterations to compromise between degree of unmixing and unwanted artifacts. The number of iterations performed similarly affects the solver described here. However, at least two methods can be implemented to suppress this effect. First, a regularization term can be allowed to impose prior knowledge of the indicator to constrain the p-norm of F. For example, an infinity norm can be used to constrain maximum dF/F to a known maximum for the indicator. For example, for particle localization, a small lq-regularization (q<=1) can be helpful in pruning artifacts. Second, damped RL iterations can be used, which flatten the Poisson log-likelihood for smaller photon counts, reducing the size of update steps in these regions. For example, a damping parameter of 1.5 can be used, which reduces steps in regions where the difference between measurement and reconstruction are smaller than $1.5\sigma$.

The solver can incorporate one or more of the following user-adjustable parameters, for example:

1) The decay time constant: a physical property of the indicator, which needs to be specified. This time constant determines the AR parameters used by the Dynamic RL updates. A decay time constant of 0 corresponds to regular RL iterations.
2) Damping parameter: residuals less than the damping parameter standard deviations will have less effect on updates. Typically, the damping parameter is chosen in the range 0-2.
3) Minimum and maximum number of iterations of the algorithm. Typical values are in the range 50-200.
4) A dark noise level, in photons, added to all expected rates
5) Gradient clipping, to clip multiplicative updates to the range [0.1, 10] per iteration, to stabilize fluctuations in the solution.
6) Off-focus spikes: to model fluorescence generated by scattered excitation light, useful for deep in vivo imaging.
7) Baseline multiplier: fraction of the minimum of data used as the estimate of the baseline.
8) Reconstruction algorithm: Richardson-Lucy iterations or multiplicative nonnegative least squares.

Parameter 1 should be set appropriately using a priori knowledge of the indicator, or slightly underestimated if uncertain. Default values of the other parameters are suitable for most datasets.

Table 1 below summarizes the default values of these parameters for different datasets that have been obtained:

TABLE 1

| | Particle Tracking | In-Vitro Imaging | In-Vivo Imaging |
|---|---|---|---|
| Decay time constant | NA | 50 ms | 10 ms |
| damping | 0 | 1.5 | 0 |
| Minimum/maximum iterations | 100-100 | 50-100 | 50-100 |
| Dark noise | 0 | 0.01 | 0.01 |
| Gradient clipping | NA | true | true |
| Baseline multiplier | No baseline | 1 | 0.5 |
| Off-focus spikes | NA | 0 | 0 |
| Reconstruction algorithm | RL | RL | RL |

Figure 8:
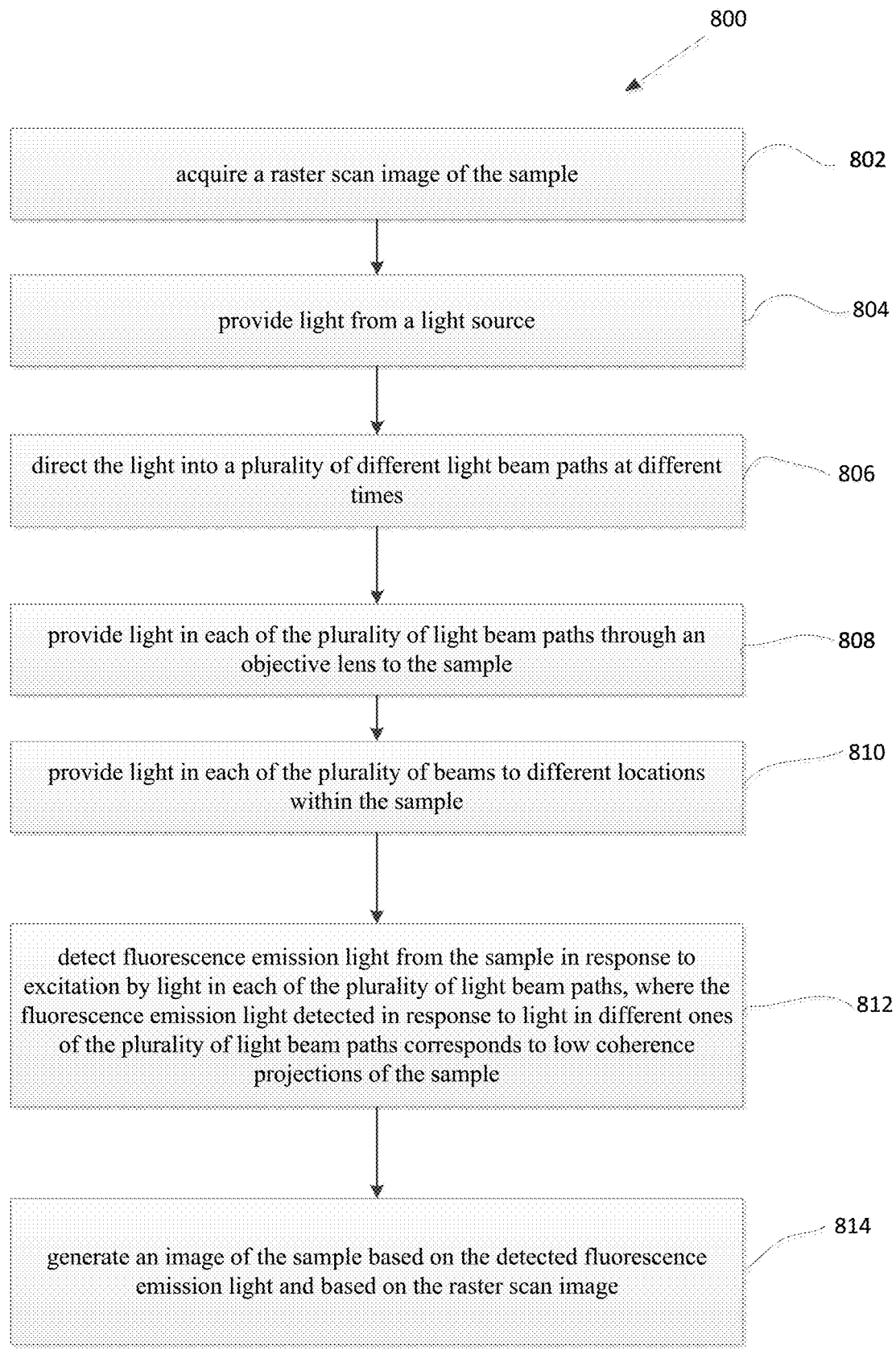
FIG. 8 is a flowchart of a process for imaging a sample.

FIG. 8 is a flowchart of a process 800 for imaging a sample. In the process 800, a raster scan image of the sample is acquired (802). For example, the raster scan image can be acquired by raster scanning excitation light through the sample, detecting light emitted in response to the raster scanned excitation light, and generating the raster scanned image based on the detected light. In the process 800, light is provided from a light source (804), and the light is light directed into a plurality of different light beam paths at different times (806). Light in each of the plurality of light beam paths is provided through an objective lens to the sample (808), and light in each of the plurality of beams is provided to different locations within the sample (810). For example, light in each of the plurality of light beams can be provided to the sample in the form or a focused line of light, and the line can be scanned across the sample, for example, in a direction having a component perpendicular to the axis of the line. Fluorescence emission light from the sample in response to excitation by light in each of the plurality of light beam paths can be detected (812), where the fluorescence emission light detected in response to light in different ones of the plurality of light beam paths corresponds to fluorescence intensity projections of the sample with low mutual coherence. Then, an image of the sample can be generated based on the detected fluorescence emission light and based on the raster scan image (814).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method of imaging a sample, the method comprising: acquiring a raster scan image of a volume of the sample; providing light from a light source; directing the light into a plurality of different light beam paths at different times; providing light in each of the plurality of light beam paths through an objective lens to the sample; providing light in each of the plurality of beams to different locations within the sample; detecting fluorescence emission light from the sample in response to excitation by light in each of the plurality of light beam paths, wherein the fluorescence emission light detected in response to light in different ones of the plurality of light beam paths corresponds to fluorescence intensity projections of the sample in which light is emitted from different locations within the sample at the same time; and generating an image of the sample based on the detected fluorescence emission light and based on the raster scan image, wherein the generating includes using the raster scan image to determine spatial information about activity components of the sample.

2. The method of claim 1, wherein light in different ones of the plurality of light beam paths is provided to the sample to form a two-dimensional or three-dimensional intensity pattern in the sample with low mutual coherence between light intensities produced in the sample by different ones of the plurality of light beam paths.

3. The method of claim 1, wherein light in different light beam paths is provided to the sample at different angles with respect to a reference direction in a focal plane of the objective lens.

4. The method of claim 1, wherein light in each of the plurality of light beam paths is provided to the sample to form a line focus at a different angle with respect to a reference orientation.

5. The method of claim 4, wherein a width of the line of light is specified by a resolution limit of an objective lens through which the line of light is provided to the sample.

6. The method of claim 1, further comprising:
switching the light from the light source with an electro-optical modulator into two different intermediate paths;
switching the light in each of in the intermediate paths with a respective mechanical scanner into different ones of the plurality of light beams.

7. The method of claim 1, wherein providing light in each of the plurality of beams to the sample includes modulating light in each of the plurality of light beams with a spatial light modulator to provide a programmable subset of the beam onto the light beam path that enters the sample.

8. The method of claim 7, wherein the programmable subset of the beam that enters the sample corresponds to one or more locations of regions of interest in the sample.

9. The method of claim 1, wherein generating an image of the sample includes generating a plurality of three-dimensional images of the sample corresponding to different timepoints and labeling space-time coordinates of one or more particles in the sample that emit fluorescence light for the different time points.

10. The method of claim 1, wherein generating an image of the sample includes:
generating a plurality of images of the sample corresponding to different timepoints;
determining whether each of a plurality of emitters in the images of the sample are active or non-active at the different time points.

11. The method of claim 10, further comprising:
identifying locations of the plurality of emitters in an image corresponding to an initial timepoint; and
determining whether each of the plurality of emitters at its identified location is active or non-active in images corresponding to timepoints after the initial timepoint.

12. The method of claim 1, wherein the generated image is a two-dimensional image.

13. The method of claim 1, wherein the generated image is a three-dimensional image.

14. The method of claim 1, wherein the detected fluorescence emission light from the sample is emitted in response to a two-photon excitation process.

15. The method of claim 1, wherein providing light in each of the plurality of beams to different locations within the sample includes:
providing the light in the form of a line focus; and
scanning the light in the line focus across a focal plane of the sample.

16. The method of claim 1, wherein generating an image of the sample based on the detected fluorescence emission light and based on the raster scan image includes generating the image using an optimization algorithm to determine a brightness of segments in the sample.

17. The method of claim 1, wherein the raster scan image is acquired based on light provided to the sample in at least one of the plurality of different light beam paths.

18. A microscope for imaging a sample, the microscope comprising:
a first light source configured for generating first excitation light;
raster scanning optical elements configured for raster scanning the first excitation light through a volume of the sample;
a first detector configured for detecting light emitted from the sample in response to the raster scanned first excitation light;
a second light source configured for generating second excitation light;
beam handling optics configured for:
directing the second excitation light into a plurality of different light beam paths at different times,
providing the light in each of the plurality of light beam paths through an objective lens to the sample, and
providing light in each of the plurality of beams to different locations within the sample;
a second detector configured for detecting fluorescence emission light from the sample in response to excitation by the second excitation light in each of the plurality of light beam paths, wherein the fluorescence emission light detected in response to the second excitation light in different ones of the plurality of light beam paths corresponds to fluorescence intensity projections of the sample in which light is emitted from different locations within the sample at the same time; and
a processor configured for generating an image of the sample based on the detected light emitted from the sample in response to the raster scanned first excitation light and based on the detected fluorescence emission light emitted from the sample in response to excitation by the second excitation light in each of the plurality of light beam paths, wherein the generating includes using the raster scan image to determine spatial information about activity components of the sample.

19. The microscope of claim 18, wherein light in different ones of the plurality of light beam paths is provided to the sample to form a two-dimensional or three-dimensional intensity pattern in the sample with low mutual coherence in the sample between light in different ones of the plurality of light beam paths.

20. The microscope of claim 18, wherein light in different light beam paths is provided to the sample at different angles with respect to a reference direction in a focal plane of the objective lens.

21. The microscope of claim 18, wherein light in each of the plurality of light beam paths is provided to the sample to form a line focus at a different angle with respect to a reference orientation.

22. The microscope of claim 21, wherein a width of the line of light is specified by a resolution limit of an objective lens through which the line of light is provided to the sample.

23. The microscope of claim 18, wherein the beam handling optics include:
an electro-optical modulator configured for switching the light from the second light source into two different intermediate paths;
a first mechanical scanner configured for switching light in an intermediate path into different ones of the plurality of light beams; and
a second mechanical scanner configured for switching light in the other intermediate path into different ones of the plurality of light beams.

24. The microscope of claim 18, further comprising a spatial light modulator configured to provide a programmable subset of the beam onto the light beam path that enters the sample.

25. The microscope of claim 24, wherein the programmable subset of the beam that enters the sample corresponds to one or more locations of regions of interest in the sample.

26. The microscope of claim 18, wherein generating an image of the sample includes generating a plurality of three-dimensional images of the sample corresponding to different timepoints and labeling space-time coordinates of one or more particles in the sample that emit fluorescence light for the different time points.

27. The microscope of claim 18, wherein generating an image of the sample includes:
   generating a plurality of images of the sample corresponding to different timepoints;
   determining whether each of a plurality of emitters in the images of the sample are active or non-active at the different time points.

28. The microscope of claim 27, wherein the processor is further configured for:
   identifying locations of the plurality of emitters in an image corresponding to an initial timepoint; and
   determining whether a brightness of a plurality of emitters in images corresponding to timepoints after the initial timepoint.

29. The microscope of claim 18, wherein the generated image is a two-dimensional image.

30. The microscope of claim 18, wherein the generated image is a three-dimensional image.

31. The microscope of claim 18, wherein the detected fluorescence emission light from the sample is emitted in response to a two-photon excitation process.

32. The microscope of claim 18, wherein providing light in each of the plurality of beams to different locations within the sample includes:
   providing the light in the form of a line focus; and
   scanning the light in the line focus across a focal plane of the sample.

33. The microscope of claim 18, wherein generating an image of the sample based on the detected fluorescence emission light and based on the raster scan image includes generating the image using an optimization algorithm to determine a brightness of segments in the sample.

34. The microscope of claim 18, wherein the raster scan image is acquired based on light provided to the sample in at least one of the plurality of different light beam paths.

35. The microscope of claim 18, wherein the first and second detectors are different.

36. The microscope of claim 18, wherein the first and second light sources are different.

* * * * *